United States Patent Office 3,775,461
Patented Nov. 27, 1973

3,775,461
HYDROCYANATION OF OLEFINS
William Charles Drinkard, Jr., Wilmington, Del., and Brian W. Taylor, Pittsburgh, Pa., assignors to E. I. du Pont de Nemours and Company, Wilmington, Del.
No Drawing. Continuation-in-part of application Ser. No. 771,313, Oct. 28, 1968, now Patent No. 3,579,560, which is a continuation-in-part of abandoned application Ser. No. 680,969, Nov. 6, 1967. This application Feb. 1, 1971, Ser. No. 111,617
Int. Cl. C07c 121/04
U.S. Cl. 260—465.3    21 Claims

ABSTRACT OF THE DISCLOSURE

A process for hydrocyanating an olefinically unsaturated organic compound having 2 to 20 carbon atoms by reacting the unsaturated organic compound with hydrogen cyanide in the presence of a compound such as $(Z_3P)_3CoX$, where Z is R or OR, R is an alkyl or aryl group having up to 18 carbon atoms and X is halide or CN, at a temperature in the range of $-25$ to $200°$ C. and recovering the hydrocyanated organic compound.

CROSS-REFERENCE TO RELATED APPLICATION

This application is a continuation-in-part of application Ser. No. 771,313, filed on Oct. 28, 1968 by William Charles Drinkard, Jr. and Brian W. Taylor, now U.S. Pat. 3,579,560, which in turn is a continuation-in-part of application Ser. No. 680,969, now abandoned, filed Nov. 6, 1967 by the same inventors.

BACKGROUND OF THE INVENTION

It is known that the addition of hydrogen cyanide to double bonds adjacent an activating group such as a nitrile or acyloxy group, proceeds with relative ease. However, the addition of hydrogen cyanide to non-activated double bonds proceeds only with difficulty, if at all, and normally requires the use of high pressures of about 1,000 p.s.i. or more and high temperatures in the range of 200 to 400° C. U.S. Pat. No. 2,666,748, issued Jan. 19, 1954, to Paul Arthur, Jr., and Burt Carlson Pratt, discloses a technique which involves the use of cobalt carbonyl with or without the addition of a tertiary aryl phosphine or arsine. This process suffers from producing a relatively high percentage of undesirable polymeric products when applied to monoolefinic starting materials and a relatively poor yield in all cases. Furthermore, this process is not satisfactory for the production of adiponitrile from 3- or 4-pentenenitrile. The selective formation of 4-pentenenitrile from 3-pentenenitrile without formation of the thermodynamically more stable 2-pentenenitrile is believed to be unknown in the art.

SUMMARY OF THE INVENTION

The present invention provides a process or a step in a process which produces nitriles or dinitriles from olefins in high yield under mild conditions, with minimal formation of polymer.

The process of the present invention is generally applicable to unsaturated compounds of from 2 to 20 carbon atoms having at least one aliphatic carbon-carbon double bond. Butadiene, 3-pentenenitrile, 4-pentenenitrile and 2-methyl-3-butenenitrile are especially preferred. Suitable unsaturated compounds include mono-olefins and monoolefins substituted with groups which do not attack the catalyst such as cyano, aldehyde, ester, and ketone.

These unsaturated compounds include diolefins such as butadiene, monoolefins containing from 2 to 20 carbon atoms such as ethylene, propylene, butene-1, pentene-2, hexene-2, etc., and substituted compounds such as styrene, 3-pentenenitrile, and 4-pentenenitrile. The process also finds special advantage in the production of 2-methylglutaronitrile from 2-methyl-3-butenenitrile.

In the preferred process of the present invention wherein adiponitrile is formed from 3-pentenenitriles or 2-methyl-3-butenenitrile the reaction proceeds in several steps. The first step involves the isomerization of 2-methyl-3-butenenitrile to 3-pentenenitriles. The next step involves the isomerization of 3-pentenenitriles to 4-pentenenitrile followed by the final step, which involves the addition of hydrogen cyanide to 4-pentenenitrile to form adiponitrile. In this process the 3-pentenenitriles and 2-methyl-3-butenenitrile can be made by the hydrocyanation of butadiene.

The isomerization steps are catalyzed by cobalt or rhodium compounds having a valence of less than $+2$, generally having an effective valence in the system of from 0.25 to 1.75, and the hereinbelow defined cobalt or rhodium compounds for catalyzing the hydrocyanation step.

The catalysts for the hydrocyanation step are cobalt or rhodium compounds wherein at least some of the cobalt or rhodium is believed to have a valence of $+1$. Such catalysts can readily be prepared from conventional cobalt or rhodium compounds wherein the cobalt or rhodium has a valence of $-1$ such as $HCo[P(C_6H_5)_3]_4$ or $HCo[POC_6H_5)_3]_4$; 0 such as $So_2(CO)_6[POC_6H_5)_3]_2$; 2 such as $CoCl_2$; or 3 such as $RhCl_3$, by treating such compound with an appropriate amount of an oxidizing or reducing agent so as to bring the average or effective valence of the cobalt or rhodium below $+2$, generally to within the range of $+0.25$ to $+1.75$, and preferably within the range of $+0.75$ to $+1.25$. The cobalt or rhodium may be supplied to the catalyst system in many forms including coordination compounds of cobalt or rhodium or salts of cobalt or rhodium. Suitable coordination compounds may contain the low valent cobalt or rhodium in conjunction with a sigma/pi bonding ligand. The compound is then oxidized by a convenient means such as with ferric chloride to form a catalyst of the structure $L_3MX$ wherein M is selected from the class consisting of Co and Rh, X is an anion and L is a neutral ligand. The ligands useful as L may be defined as any atoms or molecule capable of functioning as a sigma/pi bonded partner in one or more coordinate bonds. A description of such ligands may be found in Advanced Inorganic Chemistry by F. Albert Cotton and G. Wilkinson, published by Interscience Publishers, a division of John Wiley & Sons, 1962, Library of Congress catalog card No. 62–14818; particularly on pages 602–606. Preferred ligands for use here have the structure $Z_3M'$ wherein Z and M' have the meanings defined below.

In the case where the cobalt or rhodium is supplied to the system as a salt or as a $+2$ or $+3$ valent complex it is generally necessary to utilize a reducing agent. Convenient reducing agents to use are metals which are sufficiently electronegative to reduce cobalt to $Co^{+1}$ or rhodium to $Rh^{+1}$. In a preferred aspect of the invention the cobalt or rhodium salt is reduced with a metal, which metal also serves as a promoter for the catalyst. Such promoters are described below. Suitable cobalt and rhodium salts generally are the salts of the mineral acids, and lower fatty acids, organic sulfonic acids, acetonylacetonate, fluoroboric acid and salicaldehyde. Of these, the halides and particularly the chlorides, bromides, and iodides, are preferred because of their availability and simplicity of use.

In a preferred aspect of the invention a phosphite is used to enhance the activity of the catalyst and to control the isomer distribution of the product. This is particularly important in the production of adiponitrile from 3-pentenenitrile or 4-pentenenitrile where a catalyst system such as cobalt chloride and iron gives a product consisting almost entirely of methyl glutaronitrile whereas the same catalyst system when used in conjunction with a phosphite such as triphenyl phosphite can be given a product in which 80 percent or more of the dinitriles produced are adiphonitrile which normally is the desired product. The preferred phosphites have the structure $P(OR)_3$ wherein R is an alkyl or aryl radical of up to 18 carbon atoms. Generally the phosphite is used in a molar ratio of phosphite to cobalt or rhodium of from 0.5:1 to 12:1 and preferably from 2.5:1 to 4.5:1.

A preferred class of catalysts are believed to have the structure $[(Z)_3M']_3MX$ wherein Z is selected from the class consisting of OR and R, wherein R is selected from the class consisting of alkyl and aryl groups having up to 18 carbon atoms, M is selected from the class consisting of cobalt and rhodium, X is a halide or CN and M' is selected from the class consisting of P, As and Sb. These catalysts can be prepared by any of several techniques; for instance, catalysts of the formula $(Z_3M')_3RhX$ wherein Z, M' and X have the meanings defined above, are readily prepared by mixing a rhodium halide with an excess of a compound of the formula $Z_3P$ at a moderately elevated temperature such as 100° C. When using the cobalt catalysts, the catalyst can also be prepared in situ by adding the two components to the reaction vessel preferably in substantially equimolar amounts. The

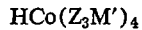

$$HCo(Z_3M')_4$$

starting material can be prepared by the technique set forth in Example 55 below. Preferably, these catalyst compounds are prepared by the partial reduction of a cobalt halide with a metal such as zinc or iron in the presence of a compound of the formula $Z_3M'$ wherein Z and M' have the meanings defined above.

The hydrocyanation or isomerization reaction can be carried out with or without a solvent. The solvent should be liquid at the reaction temperature and inert towards the unsaturated compound and the catalyst. Generally, such solvents are hydrocarbons such as benzene, xylene, or nitriles such as acetonitrile, benzonitrile, or adiponitrile.

The exact temperature used is dependent, to a certain extent, on the particular catalyst being used, the particular unsaturated compound being used and the desired rate. Generally, temperatures of from —25° C. to 200° C. can be used with from 0° C. to 150° C. being the preferred range for both isomerization and hydrocyanation.

Both the isomerization reaction and the hydrocyanation reaction may be carried out by charging a reactor with all of the reactants. Preferably, in the case of of hydrocyanation the reactor is charged with the catalyst or catalyst components, the unsaturated compound and whatever solvent is to be used and the hydrogen cyanide gas is swept over the surface of the reaction mixture or bubbled through said reaction mixture. If desired, when using a gaseous unsaturated organic compound, the hydrogen cyanide and the unsaturated organic compound may be fed together into the reaction medium. The molar ratio of unsaturated compound to catalyst generally is varied from about 10:1 to 2000:1 unsaturated compound to catalyst for a batch operation. In a continuous operation operation such as when using a fixed bed catalyst type of operation, a much higher proportion of catalyst may be used such as 1:2 unsaturated compound to catalyst.

Optionally, a promoter may be used to activate the catalyst for the hydrocyanation reaction. The promoter generally is a Lewis acid such as a cationic form of a metal such as zinc, cadmium, beryllium, aluminum, gallium, indium, thallium, titanium, zirconium, hafnium, erbium, germanium, tin, vanadium, niobium, scandium, chromium, molybdenum, tungsten, manganese, rhenium, palladium, thorium, copper, lead and iron. Other suitable promoters are salts of the metals listed above an include aluminum chloride, zinc chloride, cadmium iodide, titanium trichloride, titanium tetrachloride, zinc acetate, ethyl aluminum dichloride, chromic chloride, stannous chloride and zinc iodide. The promoter acts to improve catalyst efficiency and, in certain cases such as the hydrocyanation of 3- or 4-pentenenitrile to adiponitrile, can re-result in an improved yield. The preferred promoters are cationic forms of zinc, cadmium, aluminum, indium, zirconium, tin, manganese, calcium, copper, lead, and iron. These metals may be supplied to the catalyst system in the form of a salt when using a previously reduced catalyst or in the form of the metal which in the case of an unreduced catalyst in turn serves to reduce the catalyst, as well as to promote the cativity of the catalyst. Suitable anions are the halides, especially the chlorides, bromides and iodides, and the lower fatty acids. Preferably, the promoter is formed by the reaction of the metal and the unreduced or incompletely reduced catalyst precursor. Generally, the promoter is used in a molar ratio of cobalt or rhodium to promoter of from 16:1 to 1:16. The pressure used is not critical and may be varied from 0.1 to 10 or more atm. However, it is preferable to keep the partial pressure of HCN in the reactor below about 1 atm.

If desired, an excess of a pi-bonding ligand such as an aryl phosphite may also be added to the reaction mixture.

Preferably, the reaction mixture is agitated, such as by stirring or shaking.

The cyanated product can be recovered by conventional techniques such as crystallization of the product from solution or by distillation.

The nitriles formed by the present invention are useful as chemical intermediates. For instance, adiponitrile is an intermediate used in the production of hexamethylene adipamide, a commercial polyamide, useful in forming fibers, films and molded articles. Other nitriles can be converted to the corresponding acids and amines which are conventional commercial products.

DESCRIPTION OF THE PREFERRED EMBODIMENTS

In each of Examples 1–51, a 50 ml., three-necked, glass, round bottom flask, fitted with a water-cooled reflux condenser connected to a Dry Ice trap, a glas inlet above the liquid level, and a magnetic stirrer is set up in and oil bath maintained at the temperature indicated under Temp. in Table I. The flask is purged with nitrogen gas and charged with the materials indicated in Table I. In Examples 1–3, and 5–50, 20 g. of 3-pentenenitrile is charged to the flask. In Examples 4 and 51, 20 g. of 2-methyl-3-butenenitrile is charged to the flask. A stream of nitrogen gas is bubbled through liquid hydrogen cyanide contained in a 20 ml. glass flask cooled in an ice bath. The resulting gas mixture is swept across the surface of the reaction mixture in the flask. The nitrogen gas flow is adjusted so that the feed rate of HCN (measured as a liquid at 0° C.) is fed to the flask at the rate indicated in Table I. The amounts of ADN (adiponitrile), MGN (2-methylglutaronitrile), ESN (ethylsuccinonitrile), and 4-PN (4-pentenenitrile) reported in Table I in the product are based on the percentage of the particular nitrile in th crude reaction mixture as determined by gas chromatographic analysis. In Examples 2, 3, 49, and 50, the "*" indicates that the material listed under Reducing Agent is actually an activator and not a reducing agent. In Example 37, $Co(OAc)_2$ stands for cobalt acetate. In Examples 9 and 10, the "*" indicates that an oxidizing agent is used rather than a reducing agent. In Example 13, 2.5 ml. of the phosphite ligand is charged to the flask. In Examples 25 and 47, $Co(Acac)_2$ stands for cobalt acetonylacetonate. In Examples 26 and 46, $Co(Sal)_2$ stands for cobalt salicaldehyde complex. In Examples 27 and 48, $Co(Hyqn)_2$ stands for cobalt 8-hydroxyquinoline complex. In Example 50, the HCl is fed to the flask as 1 ml. of concentrated hydrochloric acid. In Example 51 the product is 7.56 g. of 3-pentenenitrile instead of 4-pentenenitrile as indicated in the table. A further reducing agent that can be used is sodium naphthenide.

TABLE I

| Example number | Catalyst Compound | Catalyst Amount, grams | Reducing agent* Compound | Reducing agent* Amount, grams | Ligand Compound | Ligand Amount, grams | HCN feed rate, ml./hr. | Temp., °C. | Time, hours | Product, percent ADN | Product, percent MGN | Product, percent ESN |
|---|---|---|---|---|---|---|---|---|---|---|---|---|
| 1 | CoCl₂ | 0.13 | Zn | 0.03 | (CH₃-C(C₆H₄-O)₃)P | | 0.05 | 80 | 72 | 2.90 | 0.84 | 0.17 |
| 2 | [(C₆H₅)₃P]₃RhCl | 0.92 | ZnCl₂* | 0.14 | Same as above | | 0.1 | 120 | 22 | 0.27 | | |
| 3 | [(C₆H₅)₃P]₃RhCl | 0.92 | ZnCl₂* | 0.28 | (C₆H₁₁-C(C₆H₄-O)₃)P | | 0.03 | 120 | 42.5 | 1.80 | 0.04 | |
| 4 | CoCl₂ | 0.65 | HCo[P(OC₆H₅)₃]₄ | 6.5 | P(OC₆H₅)₃ | 3.1 | 0.2 | 80 | 22.5 | | 11.5 | 0.56 |
| 5 | CoCl₂ | 1.30 | HCo[P(OC₆H₅)₃]₄ | 6.5 | | | 0.2 | 80 | 24 | 4.23 | 1.80 | 0.91 |
| 6 | CoBr₂ | 0.65 | HCo[P(OC₆H₅)₃]₄ | 6.5 | | | 0.2 | 80 | 50 | 15.06 | 4.54 | 0.59 |
| 7 | CoI₂ | 1.1 | HCo[P(OC₆H₅)₃]₄ | 6.5 | | | 0.1 | 80 | | 10.68 | 2.8 | 1.63 |
| 8 | HCo[P(OC₆H₅)₃]₄ | 1.5 | HCo[P(OC₆H₅)₃]₄ | 0.6 | | | 0.1 | 80 | 46 | 30.5 | 7.79 | |
| 9 | HCo[P(OC₆H₅)₃]₄ | 6.5 | FeCl₃* | 6.5 | | | 0.1 | 80 | 17 | 5.6 | 1.3 | 0.2 |
| 10 | CoCl₂ | 1.3 | HgCl₂* | 1.3 | P(OC₆H₅)₃ | 6.2 | 0.1 | 80 | 16 | 42.79 | 4.36 | 1.68 |
| 11 | CoCl₂ | 1.3 | Fe | 1.3 | | | | | | | | |
| 12 | CoCl₂ | 1.3 | Fe | | (CH₃-C(C₆H₄-O)₃)P | 0.28 | 0.1 | 80 | 21 | 20.14 | 3.74 | 0.47 |
| 13 | CoCl₂ | 1.3 | Fe | | (C₆H₁₉-C(C₆H₄-O)₃)P | 0.28 | 0.1 | 80 | 21 | 6.87 | 0.33 | 0.38 |
| 14 | CoCl₂ | 1.3 | Fe | | P(OC₆H₅)₂(OC₈H₁₇) | 0.28 | 0.1 | 80 | 22 | 14.21 | 4.37 | 0.64 |
| 15 | CoCl₂ | 1.3 | Fe | | P(OC₆H₅)₃ | 1.0 | 0.1 | 80 | 21 | 2.08 | 0.48 | 0.15 |
| 16 | CoCl₂ | 1.3 | Sn | | P(OC₆H₅)₃ | 0.28 | 0.1 | 100 | 19 | 0 | 0.17 | 0 |
| 17 | CoCl₂ | 1.3 | Zn | | P(OC₆H₅)₃ | 0.1 | 0.1 | 100 | 22 | 15.69 | 5.63 | 0.70 |
| 18 | CoCl₂ | 1.3 | Al | | P(OC₆H₅)₃ | 0.25 | 0.1 | 100 | 22 | 41.69 | 12.96 | 1.79 |
| 19 | CoCl₂ | 1.3 | Ni | | P(OC₆H₅)₃ | 0.1 | 0.1 | 100 | 23 | 0.81 | 1.67 | 0.111 |
| 20 | CoCl₂ | 1.3 | Mg | | P(OC₆H₅)₃ | 0.3 | 0.1 | 100 | 22 | 3.41 | 1.44 | 0.48 |
| 21 | CoCl₂ | 1.3 | Zn | | P(OC₆H₅)₃ | 0.25 | 0.1 | 100 | 22 | 5.85 | 4.95 | 0.20 |
| 22 | CoCl₂ | 1.3 | Mn | | P(OC₆H₅)₃ | 0.25 | 0.1 | 100 | 22 | 12.96 | 3.75 | 0.52 |
| 23 | CoCl₂ | 1.3 | Cr | | P(OC₆H₅)₃ | 0.3 | 0.1 | 100 | 22 | 13.92 | 6.09 | 0.90 |
| 24 | CoCl₂ | 1.3 | Cu | | P(OC₆H₅)₃ | 1.0 | 0.1 | 100 | 22 | 27.75 | 2.01 | 6.06 |
| 25 | Co(Acac)₂ | 2.6 | Pb | | P(OC₆H₅)₃ | 0.28 | 0.1 | 100 | 21 | 0 | 1.14 | 0.15 |
| 26 | Co(Sal)₂ | 3.0 | Fe | | P(OC₆H₅)₃ | 2.6 | 0.1 | 80 | 6 | 0.15 | 0.25 | 0.27 |
| 27 | Co(Hyqn)₂ | 3.5 | Fe | | | | 0.1 | 80 | 21 | 14.91 | 8.23 | 0.80 |
| 28 | CoCl₂ | 1.3 | Fe | | P(OC₆H₅)₃ | 6.2 | 0.1 | 140 | 19 | 0.17 | 0.17 | 6 |
| 29 | CoCl₂ | 1.3 | In | | P(OC₆H₅)₃ | 12.4 | 0.1 | 100 | 22 | 13.99 | 4.36 | 1.20 |
| 30 | CoCl₂ | 1.3 | Nb | | P(OC₆H₅)₃ | 0.43 | 0.1 | 100 | 19 | 0.56 | 0.18 | 3 |
| 31 | CoCl₂ | 1.3 | Hf | | P(OC₆H₅)₃ | 1.1 | 0.1 | 100 | 22 | 1.78 | 0.48 | 0.10 |
| 32 | CoCl₂ | 1.3 | Ce | | P(OC₆H₅)₃ | 0.7 | 0.1 | 100 | 21 | 16.92 | 3.79 | 0.75 |
| 33 | CoCl₂ | 1.3 | Zr | | P(OC₆H₅)₃ | 0.4 | 0.1 | 100 | 22 | 0.29 | 0.22 | 5 |
| 34 | CoCl₂ | 1.3 | Ti | | P(OC₆H₅)₃ | 0.8 | 0.1 | 100 | 22 | 19.39 | 4.93 | 0.80 |
| 35 | CoCl₂ | 1.3 | CaH | | P(OC₆H₅)₃ | 0.5 | 0.1 | 100 | 22 | 0.22 | 0.20 | 2 |
| 36 | CoCl₂ | 1.3 | V | | P(OC₆H₅)₃ | 0.28 | 0.1 | 100 | 22 | 0.17 | 0.38 | 0 |
| 37 | Co(OAc)₂ | 1.2 | Fe | | P(OC₆H₅)₃ | 1.0 | 0.1 | 100 | 22 | 0.21 | 1.19 | 0 |
| 38 | CoCl₂ | 1.3 | Bi | | P(OC₆H₅)₃ | 0.28 | 0.1 | 100 | 22 | 0 | 0.19 | 0 |
| 39 | Co(BF₄)₂ | 2.3 | Fe | | P(OC₆H₅)₃ | 0.28 | 0.1 | 100 | 22 | 0 | 0.18 | 0 |
| 40 | CoF₂ | 1.0 | Fe | | P(OC₆H₅)₃ | 0.28 | 0.1 | 100 | 22 | | | |

TABLE I—Continued

| Example number | Catalyst Compound | Catalyst Amount, grams | Reducing agent* Compound | Reducing agent Amount, grams | Ligand Compound | Ligand Amount, grams | Amount, grams | HCN feed rate, ml./hr. | Temp., °C. | Time, hours | Product percent ADN | Product percent MGN | Product percent ESN |
|---|---|---|---|---|---|---|---|---|---|---|---|---|---|
| 41 | CoCl₂ | | B₁₀H₁₄ | 1.3 | P(OC₆H₅)₃ | 0.1 | 12.4 | 0.1 | 100 | 20 | 1.0 | 0.59 | 0 |
| 42 | CoCl₂ | | NaBH₄ | 1.3 | P(OC₆H₅)₃ | 0.1 | 12.4 | 0.1 | 100 | 20 | 0.47 | 1.16 | 0 |
| 43 | CoCl₂ | | P(C₄H₉)₃ | 1.3 | P(OC₆H₅)₃ | 1.0 | 12.4 | 0.1 | 100 | 21 | 0.46 | 1.14 | 0 |
| 44 | CoCl₂ | | Cr(CO)₆ | 1.3 | P(OC₆H₅)₃ | 0.8 | 12.4 | 0.1 | 100 | 21 | 0.2 | 0.55 | 6.44 |
| 45 | Co(CN)₂ | | CaH₂ | 1.1 | | 0.4 | | 0.1 | 100 | 22 | 0.149 | 0.18 | 0.32 |
| 46 | Co(Sal)₂ | | Zn | 3.0 | | 0.33 | | 0.1 | 100 | 22 | 0 | 3.43 | 0.41 |
| 47 | Co(Acac)₂ | | Zn | 2.0 | | 0.33 | | 0.1 | 100 | 22 | 0.21 | 4.33 | 0.16 |
| 48 | Co(Hyqn)₂ | | Zn | 3.5 | | 0.33 | | 0.1 | 100 | 22 | 0 | 0.45 | |
| 49 | HCo[P(O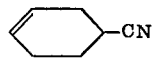CH₃)₃]₄ | | ZnCl₂* | 1.47 | | 0.14 | | 0 | 100 | 20 | 4-PN 1.5 | | |
| 50 | [(C₆H₅)₃P]₃RhCl | | HCl* | 0.92 | | 6.5 | | 0.2 | 120 | 2 | | | |
| 51 | CoCl₂ | | HCo[P(OC₆H₅)₃]₄ | 0.65 | | 6.5 | | 0 | 120 | 22 | | 7.56 | |

Example 52

A 400 ml., stainless steel pressure tube is cooled in Dry Ice. The tube is sparged with nitrogen and 6.5 g. of HCo[P(OC₆H₅)₃]₄, 0.65 g. of CoCl₂, 87 ml. of liquid butadiene, and 35 ml. of liquid hydrogen cyanide are charged. The tube is sealed, evacuated briefly, and heated at 100° C. for 8 hours. At the end of this time the tube is cooled to 25° C., vented, and the liquid recovered.

Gas chromatographic analysis shows that the liquid sample contains 3-pentenenitriles and 2-methyl-3-butenenitrile.

Example 53

A 50 ml., three-necked round bottom, glass flask fitted with a water cooled reflux condenser connected to a Dry Ice trap, a gas inlet above liquid levels, and a magnetic stirrer is set up in an oil bath maintained at 120° C. The flask is purged with nitrogen gas and charged with 6.5 g. of HCo[P(OC₆H₅)₃]₄, 0.65 g. of CoCl₂, and 20 g. of 2-methyl-3-butenenitrile. The mixture is heated at 120° C. for 22 hours. At the end of this time gas chromatographic analysis shows that the liquid sample contains 7.56 percent 3-pentenenitriles.

The tetrakis-(triphenyl phosphite) cobalt hydride used in the preceding examples is prepared in accordance with Example 54.

Example 54

A three-necked glass flask equipped with nitrogen gas inlet, a water cooled reflux condenser and a mechanical stirrer, is charged with 29.0 g. (0.10 mole) of cobalt nitrate hexahydrate and 400 ml. of acetonitrile. This salt is brought into solution on a steam bath and 150 g. (0.50 mole) of triphenyl phosphite is added. The color changes from blue to dark purple. The solution is cooled to room temperature and 5.0 g. (0.136 mole) of sodium borohydride is added in small portions over a period of about 4 hours. The color of the reaction mixture slowly changes from blue to brown to yellow, while at the same time a yellow precipitate is being formed. The precipitate is collected, washed with methanol and redissolved from the filter with 200 ml. of benzene to remove inorganic salts. The tetrakis (triphenylphosphite) cobalt hydride is precipitated with 1.5 liters methanol, filtered and dried under vacuum, M.P. 146–148°. Recrystallization from benzene/CH₃OH (9/1) raises the melting point to 157–159°. The yield is 71 g. (54.5%).

Example 55

A 50 ml., three-necked round bottom glass flask fitted with a water cooled reflux condenser connected to a Dry Ice trap, a gas inlet above liquid level, and a magnetic stirrer is set up in an oil bath maintained at 80° C. The flask is purged with nitrogen gas and charged with 1.3 g. CoCl₂, 6.2 g. P(OC₆H₅)₃, 0.28 g. iron powwer, and 20 ml.

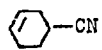

A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that about 0.1 ml. per hour of hydrogen cyanide (measured as a liquid at 0° C.) is fed to the reaction flask. After 24 hours the reaction is shut down.

Gas chromatographic analysis and infrared analysis indicate the hydrocyanation of the carbon-carbon double bond of the

⟨⟩—CN has taken place.

Example 56

A 50 ml., three-necked round bottom glass flask fitted with a water cooled reflux condenser connected to a Dry Ice trap, a gas inlet above liquid level and a magnetic stirrer is set up in an oil bath maintained at 80° C. The flask is purged with nitrogen gas and charged with 1.3 g. CoCl₂, 6.2 g. P(OC₆H₅)₃, 0.28 g. iron powder, 10 ml. CH₃CN and 10 ml.

A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that about 0.1 ml. per hour of hydrogen cyanide (measured as a liquid at 0° C.) is fed to the reaction flask. After 23 hours the reaction is shut down.

Gas chromatographic analysis and infrared analysis indicates that hydrocyanation of the carbon-carbon double bond of the

Example 57

Example 56 is repeated except 10 ml. of

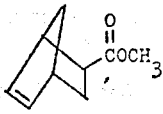

is substituted for the

of Example 56 and the reaction is shut down after 21 hours. Again, gas chromatographic analysis and infrared analysis indicate the hydrocyanation of the carbon-carbon double bond of the

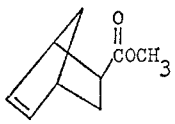

Example 58

A 50 ml., three-necked round bottom glass flask fitted with a water cooled reflux condenser connected to a Dry Ice trap, a gas inlet above liquid level and a magnetic stirrer is set up in an oil bath maintained at 80° C. The flask is purged with nitrogen gas and charged with 1.3 g. CoCl₂, 6.2 g. P(OC₆H₅)₃, 25 ml. allyl cyanide, and 0.28 g. iron powder. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that about 0.1 ml. per hour of hydrogen cyanide (measured as a liquid at 0° C.) is fed to the reaction flask. After 21 hours the reaction is shut down.

Gas chromatographic analysis indicates that the crude reaction mixture contains 22.8 percent glutaronitrile.

Example 59

A 50 ml., three-necked round bottom glass flask fitted with a water cooled reflux condenser connected to a Dry Ice trap, a gas inlet above liquid level and a magnetic stirrer is set up in an oil bath maintained at 80° C. The flask is purged with nitrogen gas and charged with 1.3 g. CoCl₂, 6.2 g. P(OC₆H₅)₃, 0.28 g. iron powder, and 25 ml. 2-methyl-3-butenenitrile. A stream of nitrogen gas is bubbled through liquid hydrogen cyanide contained in a flask cooled in an ice bath. The resulting gas mixture is swept across the surface of the reaction mixture in the flask. The nitrogen gas flow is adjusted so that about 0.1 ml. per hour of hydrogen cyanide (measured as a liquid at 0° C.) is fed to the reaction flask. After 21 hours the reaction is shut down.

Gas chromatographic analysis indicates that the crude reaction mixture contains 0.09 percent adiponitrile, 23.2 percent 2-methyl glutaronitrile, and 0 percent ethyl succinonitrile.

Example 60

A 50 ml., three-necked round bottom glass flask fitted with a water cooled reflux condenser connected to a Dry Ice trap, a gas inlet above liquid level, and a magnetic stirrer is set up in an oil bath maintained at 120° C. The flask is purged with nitrogen gas and charged with 1.3 g. of CoCl₂, 12.4 g. of P(OC₆H₅)₃, 0.08 g. of aluminum powder and 25 ml. of 2-methyl-3-butenenitrile (containng 8.32 percent 3-pentenenitrile). The mixture is heated at 130° C. for 9 hours. At the end of this time, gas chromatographic analysis shows that the liquid sample contains 17.3 percent 3-pentenenitrile.

Example 61

A reaction identical to Example 60, except aluminum powder is replaced with 0.33 g. of zinc powder, is run. At the end of the reaction, gas chromatographic analysis shows that 3-pentenenitrile concentration has increased to 16.1 percent.

Example 62

A reaction similar to Example 60 is run using 1.3 g. of CoCl₂, 9.3 g. of P(OC₆H₅)₃, 0.33 g. of zinc powder and 25 ml. of 2-methyl-3-butenenitrile. The mixture is heated at 130° C. for 9 hours. At the end of the reaction, gas chromatographic analysis shows that 3-pentenenitrile concentration has increased to 17.3 percent.

We claim:

1. A process of hydrocyanating an unsaturated organic compound containing from 2 to 20 carbon atoms and having carbon-carbon unsaturation, wherein the carbon-carbon unsaturation consists of carbon-carbon double bonds, the unsaturated organic compounds being of the class consisting of monoolefinic compounds and diolefinic compounds wherein the carbon-carbon double bonds are separated from each other by at least one carbon-carbon single bond, by contacting the unsaturated organic compound with hydrogen cyanide in the presence of a catalyst consisting essentially of a compound of the formula $(Z_3P)_3CoX$ where Z is of the group consisting of R and OR, wherein R is of the group consisting of alkyl and hydrocarbyl aryl radicals having up to 18 carbon atoms, and X is of the group consisting of halide and CN, at a temperature in the range of −25 to 200° C., and forming an organic cyano compound derived from the unsaturated organic compound by addition of hydrogen cyanide thereto.

2. The process of claim 1 wherein Z is OR.

3. The process of claim 2 wherein R is hydrocarbyl aryl.

4. The process of claim 3 wherein there is present from 16:1 to 1:16 moles per mole of cobalt of a cation of a metal selected from the group consisting of zinc, cadmium, aluminum, indium, zirconium, tin, calcium, manganese, copper, lead and iron.

5. The process of claim 4 wherein the anion portion of the compound containing the metal cation is of the group consisting of chloride, bromide and iodide.

6. The process of claim 5 wherein the unsaturated compound is of the group consisting of butadiene, 3-pentenenitrile, 4-pentenenitrile and 2-methyl-3-butenenitrile.

7. The process of claim 6 wherein X is of the group consisting of Cl, Br and I.

8. A process of hydrocyanating an unsaturated organic compound containing from 2 to 20 carbon atoms and having carbon-carbon unsaturation, wherein the carbon-carbon unsaturation consists of carbon-carbon double bonds, the unsaturated organic compounds being of the class consisting of monoolefinic compounds and diolefinic compounds wherein the carbon-carbon double bonds are separated from each other by at least one carbon-carbon single bond, which comprises feeding a reactor with the organic compound and hydrogen cyanide, in the presence of a catalyst consisting essentially of a compound of cobalt and an oxidizing or reducing agent in an amount sufficient to bring the average valence of cobalt to from 0.25 to 1.75, while maintaining the contents of the reactor at from —25 to 200° C., to form an organic cyano compound by addition of hydrogen cyanide to a carbon-carbon double bond of the unsaturated organic compound.

9. The process of claim 8 wherein the cobalt fed to the reactor in the form of a compound has a valence of at least +2 and sufficient reducing agent is fed to the reactor to reduce the valence of cobalt at least in part to +1.

10. The process of claim 9 wherein a compound of the formula $PZ_3$, wherein Z is of the group consisting of R and OR and R is of the group consisting of alkyl and hydrocarbyl aryl radicals having up to 18 carbon atoms, is fed to the reactor in a mole ratio of $PZ_3$ to cobalt of from 0.5:1 to 12:1.

11. The process of claim 10 wherein the cobalt compound fed to the reactor is of the group consisting of chloride, bromide and iodide.

12. The process of claim 11 wherein Z is OR.

13. The process of claim 12 wherein the reducing agent is of the group consisting of zinc, cadmium, aluminum, zirconium, tin, calcium hydride, manganese, copper, lead, iron, nickel, magnesium, chromium, niobium, indium, hafnium, cerium, vanadium, bismuth, sodium naphthenide, sodium borohydride, $B_{10}H_{14}$, $P(C_4H_9)_3$ and $Cr(CO)_6$.

14. The process of claim 13 wherein R is hydrocarbyl aryl.

15. The process of claim 14 wherein the unsaturated compound fed to the reactor is 3-pentenenitrile or 4-pentenenitrile and adiponitrile is formed.

16. The process of claim 8 wherein the cobalt compound fed to the reactor in the form of a compound has a valence of 0 to —1 and sufficient oxidizing agent is fed to the reactor to oxidize the cobalt at least in part to +1.

17. The process of claim 16 wherein the cobalt compound is of the formula $HCo(PZ_3)_4$ wherein Z is of the group consisting of R and OR and R is of the group consisting of alkyl and hydrocarbyl aryl radicals having up to 18 carbon atoms.

18. The process of claim 17 wherein a compound of the formula $PZ_3$ is fed to the reactor in a mole ratio of $PZ_3$ to cobalt of from 0.5:1 to 12:1, Z being defined as in claim 17.

19. The process of claim 18 wherein R is hydrocarbyl aryl.

20. The process of claim 16 wherein the compound having a valence of 0 or —1 is of the formula $HCo(PZ_3)_4$ wherein Z is OR and R is a hydrocarbyl aryl radical having up to 18 carbon atoms and the oxidizing agent is $CoX_2$ wherein X is of the group consisting of chloride, bromide and iodide.

21. The process of claim 20 wherein the unsaturated organic compound fed to the reactor is of the group consisting of butadiene, 3-pentenenitrile, 4-pentenenitrile and 2-methyl-3-butenenitrile.

References Cited
UNITED STATES PATENTS

| | | | |
|---|---|---|---|
| 3,496,217 | 2/1970 | Drinkard, Jr., et al. | 260—465.3 |
| 3,574,717 | 4/1971 | Lloyd | 260—465.3 |

JOSEPH P. BRUST, Primary Examiner

U.S. Cl. X.R.

260—464, 465 C, 465.1, 465.4, 465.8 R